US012437317B2

(12) United States Patent
Mun et al.

(10) Patent No.: US 12,437,317 B2
(45) Date of Patent: *Oct. 7, 2025

(54) SYSTEMS AND METHODS FOR MAXIMIZING BUDGET UTILIZATION THROUGH MANAGEMENT OF LIMITED RESOURCES IN AN ONLINE ENVIRONMENT

(71) Applicant: COUPANG CORP., Seoul (KR)

(72) Inventors: Jun Young Mun, Seoul (KR); Ankit Arora, Seattle, WA (US); Young Jin Kim, Seoul (KR); Ji Hoon Kim, Seoul (KR); Byoung In Lim, Seoul (KR); Jin Su Lee, Seoul (KR); Seon Ah Kim, Seoul (KR); Jae Ho Jeong, Seoul (KR); Jung Min Song, Seoul (KR); Suk Min Ahn, Seoul (KR)

(73) Assignee: Coupang Corp., Seoul (KR)

( * ) Notice: Subject to any disclaimer, the term of this patent is extended or adjusted under 35 U.S.C. 154(b) by 225 days.

This patent is subject to a terminal disclaimer.

(21) Appl. No.: 17/586,883

(22) Filed: Jan. 28, 2022

(65) Prior Publication Data

US 2022/0148032 A1  May 12, 2022

Related U.S. Application Data

(63) Continuation of application No. 16/903,427, filed on Jun. 17, 2020, now Pat. No. 11,270,335.

(51) Int. Cl.
*G06Q 30/0207* (2023.01)
*G06F 16/908* (2019.01)
(Continued)

(52) U.S. Cl.
CPC ....... *G06Q 30/0249* (2013.01); *G06F 16/908* (2019.01); *G06Q 30/0276* (2013.01); *G06Q 50/188* (2013.01)

(58) Field of Classification Search
CPC ............. G06Q 50/188; G06Q 30/0276; G06Q 30/0249; G06F 16/908
See application file for complete search history.

(56) References Cited

U.S. PATENT DOCUMENTS 7,644,103 B2  1/2010  Smith et al.
8,666,807 B1  3/2014  Murray
(Continued)

FOREIGN PATENT DOCUMENTS

CN  101673290 B  4/2011
CN  103620630 A  3/2014
(Continued)

OTHER PUBLICATIONS

Bergmann, M., Brück, C., Knauer, T. et al. Digitization of the budgeting process: determinants of the use of business analytics and its effect on satisfaction with the budgeting process. J Manag Control 31, 25-54 (2020). (Year: 2020).*
(Continued)

*Primary Examiner* — Matthew L Hamilton
(74) *Attorney, Agent, or Firm* — FINNEGAN, HENDERSON, FARABOW, GARRETT & DUNNER LLP

(57) ABSTRACT

A computer-implemented system and a method for automatic electronic order creation are disclosed. The system and method may be configured to: receive a digitized document comprising embedded metadata related to contents of the digitized document; analyze the embedded metadata to extract a boundary parameter; generate a unique reference identifier associated with the digitized document and the boundary parameter; receive a first input data setting one or more target measurements for one or more predefined periods of time, wherein a sum of the one or more target measurements is less than or equal to the boundary parameter; receive a second input data setting configuration data
(Continued)

for achieving the one or more target measurements; and generate an electronic order based on the configuration data.

16 Claims, 10 Drawing Sheets

(51) Int. Cl.
*G06Q 30/0241* (2023.01)
*G06Q 50/18* (2012.01)

(56) References Cited

U.S. PATENT DOCUMENTS

| | | |
|---|---|---|
| 2002/0194008 A1 | 12/2002 | Yang |
| 2003/0115080 A1 | 6/2003 | Kasravi |
| 2003/0229536 A1 | 12/2003 | House |
| 2006/0287967 A1 | 12/2006 | Dan |
| 2007/0008574 A1 | 1/2007 | Henry et al. |
| 2007/0067214 A1 | 3/2007 | Caprio |
| 2008/0249855 A1* | 10/2008 | Collins .............. G06Q 30/0256 705/14.54 |
| 2008/0288356 A1 | 11/2008 | Roy et al. |
| 2009/0144801 A1* | 6/2009 | Grouf .................. G06F 16/438 709/217 |
| 2011/0040636 A1 | 2/2011 | Simmons et al. |
| 2011/0202470 A1 | 8/2011 | Agrawal |
| 2013/0191207 A1 | 7/2013 | Smallwood et al. |
| 2013/0226691 A1 | 8/2013 | Chatow et al. |
| 2014/0337137 A1 | 11/2014 | Robertson |
| 2014/0337143 A1 | 11/2014 | Petersen |
| 2015/0019348 A1 | 1/2015 | Young-Lai et al. |
| 2016/0078488 A1 | 3/2016 | Simo et al. |
| 2016/0132940 A1 | 5/2016 | Frommann |
| 2016/0343038 A1 | 11/2016 | Sprecher et al. |
| 2020/0211057 A1* | 7/2020 | Kong .................. G06Q 30/0243 |
| 2020/0327172 A1 | 10/2020 | Coquard |

FOREIGN PATENT DOCUMENTS

| | | |
|---|---|---|
| CN | 111068328 A | 4/2020 |
| KR | 10-2007-0030467 | 3/2007 |
| KR | 10-2014-0120307 | 10/2014 |
| KR | 10-2017-0013954 | 2/2017 |
| KR | 10-1940973 | 1/2019 |
| KR | 10-1046204 | 2/2019 |
| KR | 10-2019-0130868 | 11/2019 |
| TW | I478087 B | 3/2015 |

OTHER PUBLICATIONS

Office Action in counterpart Taiwanese Application No. 110149507 dated Sep. 23, 2022 (5 pages).
Notice of Allowance mailed Sep. 30, 2021 in counterpart Taiwanese Application No. 109147081, 3 pages.
Decision of Patent Grant mailed Nov. 8, 2021 in counterpart Korean Application No. 10-2020-0083654, 5 pages.
Wang, H., Liu, X., & Chan, W. K. V., Resource Allocation of Internet Display Advertising Considering Multiple Metric Constraints, 2020, IEEE (Year: 2020).
International Search Report and Written Opinion mailed Apr. 15, 2021 in corresponding PCT International Application, 12 pages.
Notice of Preliminary Rejection mailed Feb. 22, 2021, by the Korean Patent Office in counterpart Korean Application No. 10-2020-0083654, 10 pages.
Preliminary Search Report mailed Aug. 25, 2020, in connection with Korean Application No. KR 10-2020-0083654, 7 pages.
Examination Notice in counterpart Hong Kong Patent Application No. 22021030170.5 dated Apr. 14, 2022 (8 pages).
Notice of Preliminary Rejection in counterpart Korean Application No. 10-2022-0014946 dated Dec. 30, 2022 (7 pages).

\* cited by examiner

500

| Category | All ▼ |
|---|---|
| Agreement | enter agreement ID |
| Period | 2020.02 |

| Manager | enter manager name or ID |
|---|---|
| Supplier | enter supplier name or ID |
| Label | All ▼ |

New Record    Export

Reset Filter    Search

520

510

| Label | Agreement ID | Effective Period | Supplier | Category | Manager | Annual Total | | | | Current Month | | | |
|---|---|---|---|---|---|---|---|---|---|---|---|---|---|
| | | | | | | Contracted | Approved | Remaining | Progress | Planned | Ordered | Approved | |
| | 200691 | 07/2019-03/2020 | Fresh Food (A00050139) | Groceries | silverpine | 13,000 | 16,450 | -3,450 | 126.5% (99.0%) | 0 | 0 | 0 | Edit |
| missing lagging | 206649 | 01/2020-12/2020 | ArkFurniture (A00047004) | Baby Furniture | bang | 20,000 | 0 | 20,000 | 0.0% (16.7%) | 0 | 0 | 0 | Edit |
| missing lagging | 208716 | 01/2020-12/2020 | EverythingBa (A00201230) | Baby Necessities | eungjang | 60,000 | 0 | 60,000 | 0.0% (16.7%) | 0 | 0 | 0 | Edit |
| lagging | 209207 | 01/2020-12/2020 | IpCosmetics (A00004468) | Beauty | jungahko | 36,000 | 3,300 | 32,700 | 9.2% (16.7%) | 3,000 | 0 | 0 | Edit |
| missing | 209185 | 01/2020-12/2020 | Okiss, Inc. (A00214881) | Beauty | blink | 180,000 | 41,800 | 138,200 | 23.2% (16.7%) | 20,500 | 20,500 | 20,500 | Edit |

SYSTEMS AND METHODS FOR MAXIMIZING BUDGET UTILIZATION THROUGH MANAGEMENT OF LIMITED RESOURCES IN AN ONLINE ENVIRONMENT

This application is a Continuation of U.S. application Ser. No. 16/903,427, filed Jun. 17, 2020 (now allowed), the contents of which is incorporated herein by reference in its entirety to provide continuity of disclosure.

TECHNICAL FIELD

The present disclosure generally relates to computerized methods and systems for automatic electronic advertisement order creation. In particular, embodiments of the present disclosure relate to inventive and unconventional systems that maximizes resource utilization by creating electronic advertisement orders based on consideration of available budget and electronic resources.

BACKGROUND

In a competitive marketplace where suppliers or vendors market their products or enter into an agreement with the owner of the marketplace to sell their products, the suppliers or vendors compete to attract more customers into buying their products. One of the primary tactics, perhaps more important than lower prices or good quality, is maximizing exposure to the customers. Low prices or quality products are ineffective for attracting customers if the customers are not even aware that the products exist.

This is where advertisements come into play. Advertisements are designed to attract customers' attention, thereby increasing product exposure and thus leading to more sales. In an online setting, advertisement activities occur through, for example, pop-ups, banners in various positions of a webpage, or prioritized appearances in search results. Such advertisement activities must be carried out by the owner or manager of the online environment where the supplier wishes to advertise. Performing these advertisement activities and receiving compensation, therefore, have become a significant source of revenue for such owners or managers.

However, keeping track of multiple advertisement agreements with different suppliers is a difficult task. At the fundamental level, it involves actually performing the advertisement activities within the budget authorized by each supplier, where it is in the owners' best interest to maximize the advertisement activities to receive as much compensation as possible. The owners must also monitor and balance how different advertisement means are being utilized. For example, once a space on a webpage is reserved for one advertisement for a period, no other advertisement can use that space for the same period.

Tracking resource utilization of multiple advertisement means across hundreds of individual webpages is not an easy task that can be automated with conventional computing elements. It involves a complex network of interconnected systems that can communicate with each other quickly and efficiently and track utilization of multiple resources, each of which fluctuates frequently.

SUMMARY

One aspect of the present disclosure is directed to a computer-implemented system for automatic electronic order creation. The system may comprise at least one non-transitory computer-readable medium configured to store instructions and at least one processor configured to execute the instructions to perform operations. The operations may comprise: receiving a digitized document comprising embedded metadata related to contents of the digitized document; analyzing the embedded metadata to extract a boundary parameter; generating a unique reference identifier associated with the digitized document and the boundary parameter; receiving a first input data setting one or more target measurements for one or more predefined periods of time, wherein a sum of the one or more target measurements is less than or equal to the boundary parameter; receiving a second input data setting configuration data for achieving the one or more target measurements; and generating an electronic order based on the configuration data.

Yet another aspect of the present disclosure is directed to a computer-implemented method for automatic electronic order creation. The method may comprise: receiving a digitized document comprising embedded metadata related to contents of the digitized document; analyzing the embedded metadata to extract a boundary parameter; generating a unique reference identifier associated with the digitized document and the boundary parameter; receiving a first input data setting one or more target measurements for one or more predefined periods of time, wherein a sum of the one or more target measurements is less than or equal to the boundary parameter; receiving a second input data setting configuration data for achieving the one or more target measurements; and generating an electronic order based on the configuration data.

Still further, another aspect of the present disclosure is directed to a computer-implemented system for automatic electronic order creation. The system may comprise: at least one non-transitory computer-readable medium configured to store instructions; at least one processor; and at least one network-connected storage in communication with the at least one processor. The at least one processor may be configured to execute the instructions to perform operations comprising: receiving a digitized document comprising embedded metadata related to contents of the digitized document; analyzing the embedded metadata to extract a boundary parameter; generating a unique reference identifier associated with the digitized document and the boundary parameter; storing the boundary parameter and the electronic document in the at least one network-connected storage with a reference pointer to the unique reference identifier; receiving a first input data setting one or more target measurements for one or more predefined periods of time, wherein a sum of the one or more target measurements is less than or equal to the boundary parameter; receiving a second input data setting configuration data for achieving the one or more target measurements; associating the one or more target measurements and the configuration data with the reference pointer with the boundary parameter in the at least one network-connected storage using the reference pointer; generating an electronic order based on the configuration data; in response to an approval of the electronic order, retrieving the configuration data from the at least one network-connected storage using the reference pointer; finalizing the retrieved configuration data for the one or more predefined periods of time; and tracking compliance to the configuration data relative to the boundary parameter over the one or more predefined periods of time.

Other systems, methods, and computer-readable media are also discussed herein.

BRIEF DESCRIPTION OF THE DRAWINGS

FIG. 5 is an exemplary embodiment of an ad tracker user interface (UI), consistent with the disclosed embodiments.

FIG. 6 is an exemplary embodiment of a record editing UI, consistent with the disclosed embodiments.

DETAILED DESCRIPTION

Figure 1A:
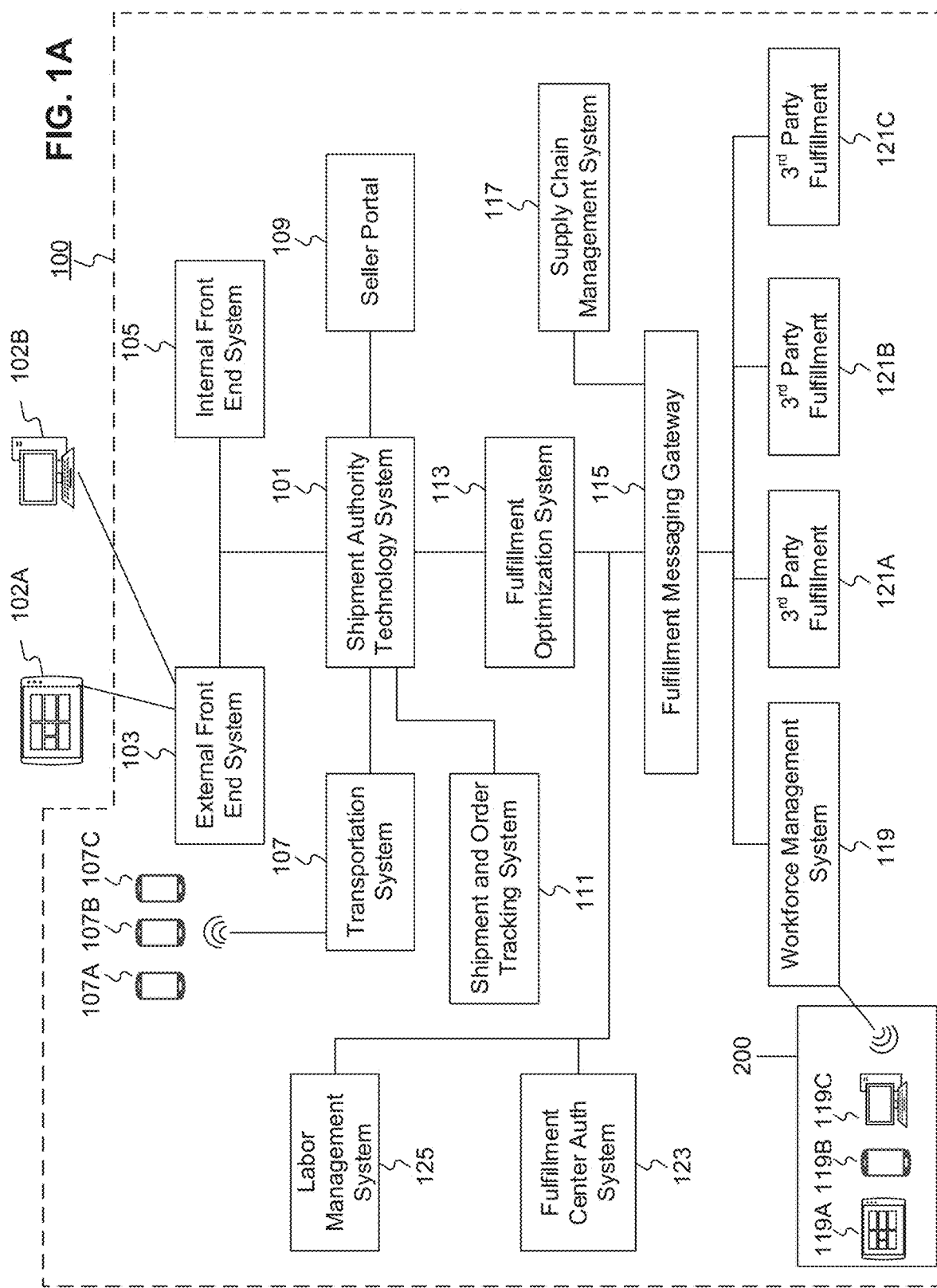
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized systems and methods that maximize resource utilization through management of budget and electronic resources in an online environment.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
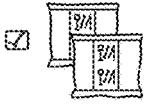
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
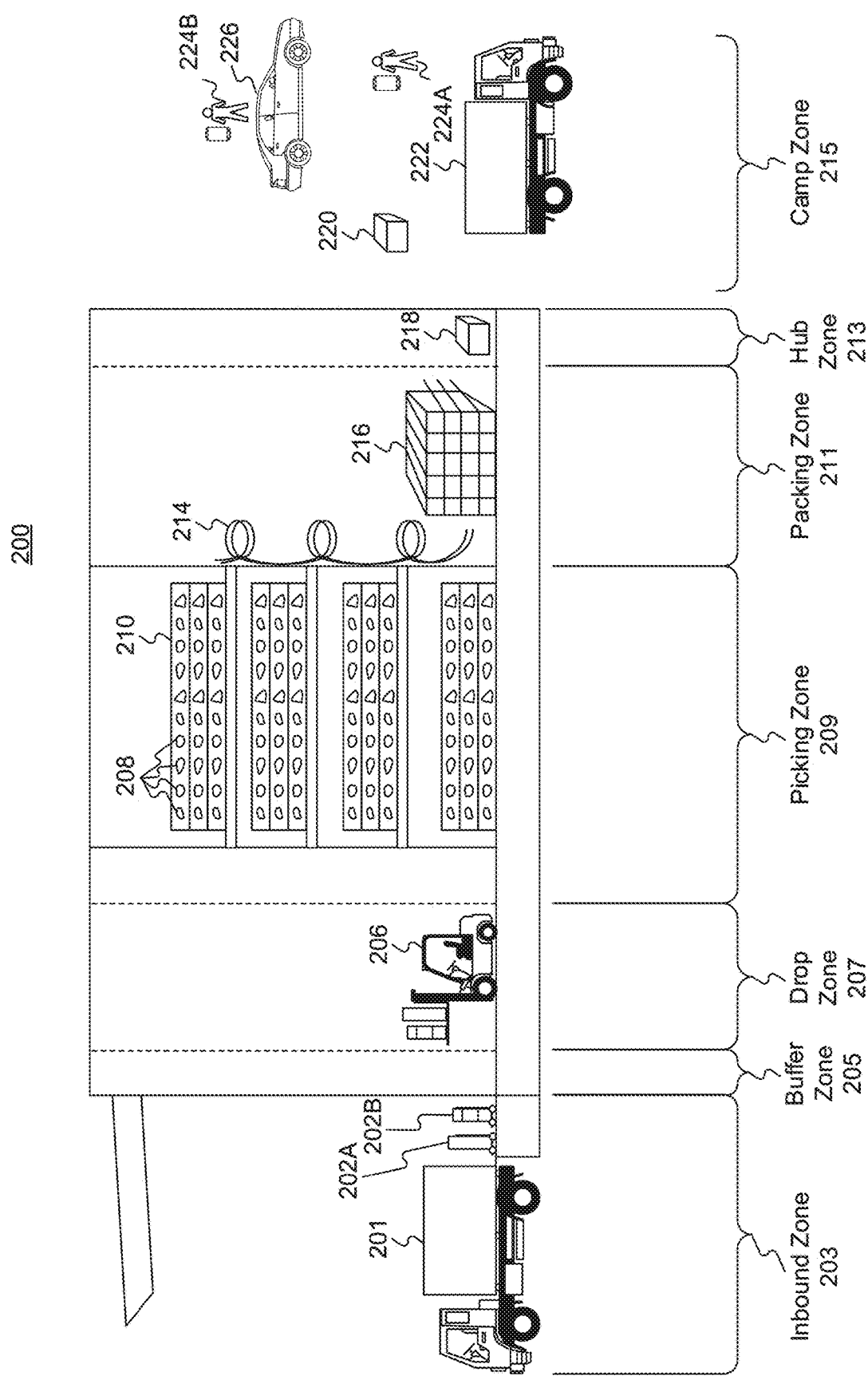
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
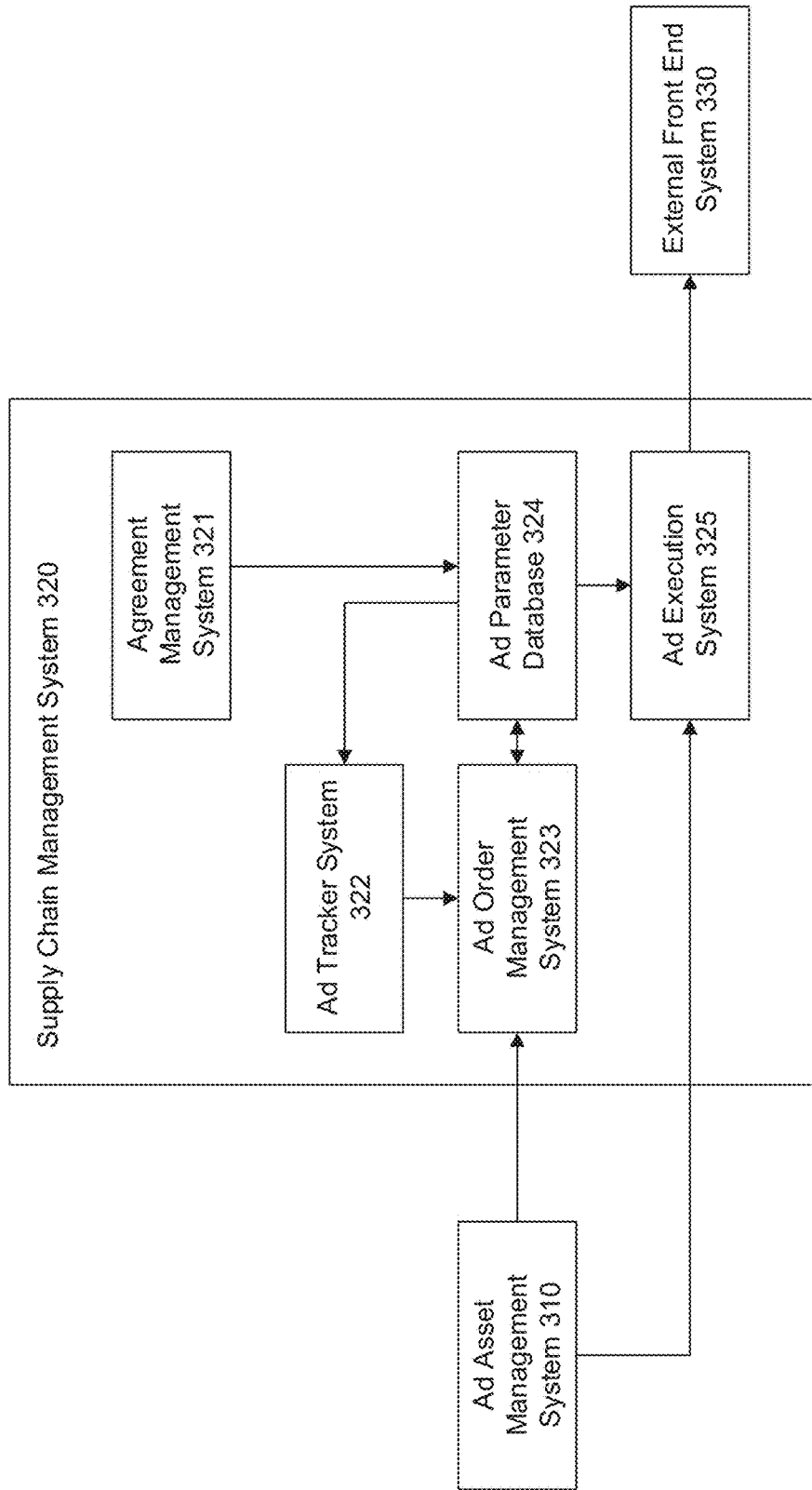
FIG. 3 is a schematic block diagram illustrating an exemplary embodiment of a networked environment comprising computerized systems for automatically creating electronic advertisement orders, consistent with the disclosed embodiments.

FIG. 3 is a schematic block diagram illustrating an exemplary embodiment of a networked environment 300 comprising computerized systems for automatically creating electronic advertisement orders. Networked environment 300 may include a variety of systems, each of which may be connected to one another via one or more networks. In some embodiments, each of the elements depicted in FIG. 3 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like.

In some embodiments, the depicted systems include an ad asset management system 310, a supply chain management system (SCM) 320, and an external front end system 330. SCM 320 and external front end system 330 may be similar in design, function, or operation to SCM system 117 and external front end system 103 described above with respect to FIG. 1A.

Ad asset management system 310, in some embodiments, may be implemented as a computer system that creates, manages, and makes available various resources necessary for displaying electronic advertisements for one or more products from the suppliers. In some embodiments, ad asset management system 310 may also include one or more databases (not shown) that store the resources. Such databases may comprise one or more hard disk drives, one or more solid state drives, or one or more non-transitory memories, and may be set up as cloud-based databases or on-premise databases.

In some embodiments, the resources may include computer graphic files (e.g., images, videos, flash files, vector files, audio files, etc.), computer-readable instructions for rendering a webpage (e.g., codes in HTML, CSS, JavaScript, SQL, PHP, etc.), or the like. One or more of the resources may be so dimensioned (e.g., 500 pixels by 100 pixels, or having a certain aspect ratio) to fit within certain positions of a webpage or a program (e.g., top banner, side banner, screen overlay). Other resources may comprise a combination of text, video, and/or image data. Still further, other one or more of the resources may be interactive, being configured to receive user input when displayed and initiate one or more actions based on the user input. The types of resources discussed herein are only exemplary and are not intended to be limiting. Other types, variations, or combinations thereof are within the scope of the disclosed embodiments.

SCM 320 may be similar in design, function, or operation to SCM 117 described above with respect to FIG. 1A. In some embodiments, SCM 320 comprises an agreement management system 321, an ad tracker system 322, an ad order management system 323, an ad parameter database 324, and an ad execution system 325.

In some embodiments, SCM 320 may comprise one or more processors, one or more memories, and one or more input/output (I/O) devices. SCM 320 may take the form of a server, general-purpose computer, a mainframe computer, a special-purpose computing device such as a graphical processing unit (GPU), laptop, or any combination of these computing devices. In these embodiments, components of SCM 320 (i.e., agreement management system 321, ad tracker system 322, ad order management system 323, ad parameter database 324, and ad execution system 325) may be implemented as one or more functional units performed by one or more processors based on instructions stored in the one or more memories. SCM 320 may be a standalone system, or it may be part of a subsystem, which may be part of a larger system.

Alternatively, the components of SCM 320 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

Agreement management system 321, in some embodiments, may include one or more computing devices configured to receive executed agreements and extract information relevant to creating electronic ads. Specifically, agreement management system 321 may receive executed agreements corresponding to one or more suppliers, each of which specify terms of advertisement activities negotiated by respective suppliers. For example, the agreement may specify a total contracted budget that the advertising company is authorized to spend over an effective period to promote one or more products sold by the corresponding supplier. Agreement management system 321 may then be configured to parse such terms from the agreements and extract key information that define boundary parameters of the advertisement activity for the corresponding supplier. Agreement management system 321 may associate the extracted boundary parameter to the corresponding supplier and store them in ad parameter database 324.

In some embodiments, agreement management system 321 may be equipped with optical character recognition technology that enables it to recognize characters in scanned versions of the agreements. Agreement management system 321 may also be able to identify and verify validity of electronic certificates embedded in the agreements in order to determine that the agreements are final and fully executed. In further embodiments, agreement management system 321 may be configured to identify and extract the terms of the advertisement activity using keyword search and/or semantic search as would be apparent to one of ordinary skill in the art. In other embodiments, agreement management system 321 may also use machine learning to recognize certain patterns of sentence structures or document layout in order to identify and extract the boundary parameters.

Alternatively or additionally, agreement management system 321 may also be configured to extract metadata associated with the agreements, recognize that an agreement is drafted from a predefined template based on the metadata, and use a lookup table or a mapping to recognize relevant parts of the agreement. For example, the predefined template may be a form with blank spaces at one or more predefined positions for a supplier to enter parameters of its desired advertisement activity. In this case, agreement management system 321 may be configured to extract parameters from the completed form by extracting data from the predefined positions.

Once the boundary parameters are extracted, agreement management system 321 may generate a record unique to each supplier and associate the extracted boundary parameters to the corresponding record. In some embodiments, agreement management system 321 may also associate each record with a unique agreement identifier that can be used as a reference key for identifying or referencing different advertisement parameters and boundary parameters. Different systems of SCM 320 or networked environment 300 may also use the agreement identifiers as reference keys.

In some embodiments, agreement management system 321 may also include one or more databases (not shown) that store the agreements. Such databases may comprise one or more hard disk drives, one or more solid state drives, or one or more non-transitory memories, and may be set up as cloud-based databases or on-premise databases.

Ad tracker system 322, in some embodiments, may include one or more computing devices configured to track current progress with respect to boundary parameters of advertisement activities for respective suppliers. Ad tracker system 322 may also be configured to allocate portions of the contracted budget over the effective period (e.g., 6 months or 1 year), setting a set of planned budgets for each unit advertisement period (e.g., 1 month). A user may access and interact with ad tracker system 322 via the one or more I/O devices of SCM 320 and/or internal front end system 105 described above with respect to FIG. 1A. The functions of ad tracker system 322 and the UI for interacting with ad tracker system 322 are described in more detail below with respect to FIGS. 5 and 6.

Ad order management system 323, in some embodiments, may include one or more computing devices configured to generate customized electronic advertisement orders by setting different advertisement parameters and drawing from the different assets available in ad asset management system 310. A user may also access and interact with ad order management system 323 via the one or more I/O devices of SCM 320 and/or internal front end system 105 described above with respect to FIG. 1A.

In some embodiments, ad order management system 323 may use the reference keys to look up and collect data from ad asset management system 310, ad tracker system 322, and ad parameter database 324 that correspond to the desired supplier. The data may include any information necessary for customizing an advertisement plan for the supplier and generating an advertisement order based on the advertisement plan, such as the contracted budget, effective period, planned budgets, ad assets corresponding to the products supplied by the supplier, and available spaces for electronic advertisements. The available spaces may refer to those spaces within webpages or software UIs that can display electronic advertisements (e.g., top banner, side banner, screen overlay) that are not already reserved to display another electronic advertisement for a given advertisement period (e.g., a particular month).

In some embodiments, a user may examine the available spaces for a given advertisement period from ad parameter database 324 and the available resources from ad asset management system 310 to generate a combination of particular set of assets and spaces for the given advertisement period. The combination may amount to an advertisement cost based on the price of using the particular spaces for a unit advertisement period (e.g., $10 for a side banner space of a webpage per month) and the cost of generating the particular advertisement assets (e.g., $20 for an asset that fits within the side banner space). This combination of spaces and assets and the associated advertisement cost may define a customized advertisement plan. The advertisement cost may not be greater than the planned budget corresponding to the given advertisement period set by the user via ad tracker system 322. In some embodiments, ad order management system 323 may generate the combination and determine the cost substantially automatically by maximizing the advertisement costs of one or more advertisement plans for multiple suppliers.

Furthermore, ad order management system 323 may generate advertisement orders (e.g., invoices or agreements) for respective suppliers based on the customized advertisement plans, detailing the manner in which electronic advertisements for the products from the supplier will be displayed. The advertisement orders may also include the cost associated with the customized advertisement plan. Ad order management system 323 may then transmit the advertisement orders to respective suppliers for review and approval. In some embodiments, ad order management system 323 may update advertisement parameters in ad parameter database 324 to hold certain spaces until the suppliers have approved the advertisement orders, so as to avoid any other user or systems from generating another advertisement order for the same space for the same advertisement period.

Once the suppliers approve the advertisement orders, ad order management system 323 may receive electronic messages or copies of the approved orders and proceed to finalize the corresponding advertisement plans. In some embodiments, ad order management system 323 may transmit signal to ad parameter database 324 to update the corresponding advertisement parameters stored therein to reflect that the orders are approved and the holds on certain spaces can now be reserved for the corresponding advertisement periods.

Ad parameter database 324, in some embodiments, may be implemented as one or more computer systems that collect, accrue, and/or provide the advertisement parameters determined by systems of networked environment 300. Ad parameter database 324 may comprise one or more hard disk drives, one or more solid state drives, or one or more non-transitory memories, and may be set up as cloud-based databases or on-premise databases.

In some embodiments, ad parameter database 324 may organize the advertisement parameters for each agreement using reference pointers to corresponding agreement identifiers so that an entire set of advertisement parameters may be easily referenced using the corresponding agreement identifier. Ad parameter database 324 may store any additional advertisement parameters or adjust existing advertisement parameters by associating the advertisement parameters with the corresponding agreement identifiers.

In further embodiments, ad parameter database 324 may associate more than one set of advertisement parameters to one agreement identifier if the corresponding agreement specifies different boundary parameters for one or more sets of products from the same supplier, or if one or more sets of the products require different advertisement plans.

In some embodiments, the advertisement parameters stored within ad parameter database 324 may include general information associated with an agreement such as the contracted budget, effective period, supplier name or identifier, and one or more categories associated with the products from the supplier. Additionally or alternatively, the advertisement parameters may also include a set of planned budgets for each advertisement period, advertisement costs ordered (invoiced) to the supplier, approved amounts based on orders approved by the supplier, and reserved amounts based on finalized advertisement plans approved and scheduled to be executed during the corresponding advertisement periods. Still further, the advertisement parameters may also include details of the customized advertisement plans such as the file addresses of the particular advertisement assets stored in ad asset management system 310, the particular spaces on webpages and software UIs where the advertisements will be displayed.

Ad execution system 325, in some embodiments, include one or more computing devices configured to execute the customized advertisement plans as specified by the advertisement parameters stored in ad parameter database 324. For example, ad execution system 325 may be configured to operate on a timed schedule where it reads the advertisement plans scheduled to execute on a given time of the year, retrieve the associated advertisement parameters and the advertisement assets, and renders webpages or software UIs according to the advertisement plans. In some embodiments, more than one advertisement plan may be active at any moment in time, so that, for example, webpages for different categories of products can display advertisements relevant to respective categories.

External front end system 330 may be similar in design, function, or operation to external front end system 103 described above with respect to FIG. 1A. In some embodiments, external front end system 103 may pull data from ad execution system 325 to render webpages or software UIs on demand from external devices (e.g., mobile device 102A or computer 102B) of external users (i.e., customers).

Figure 4:
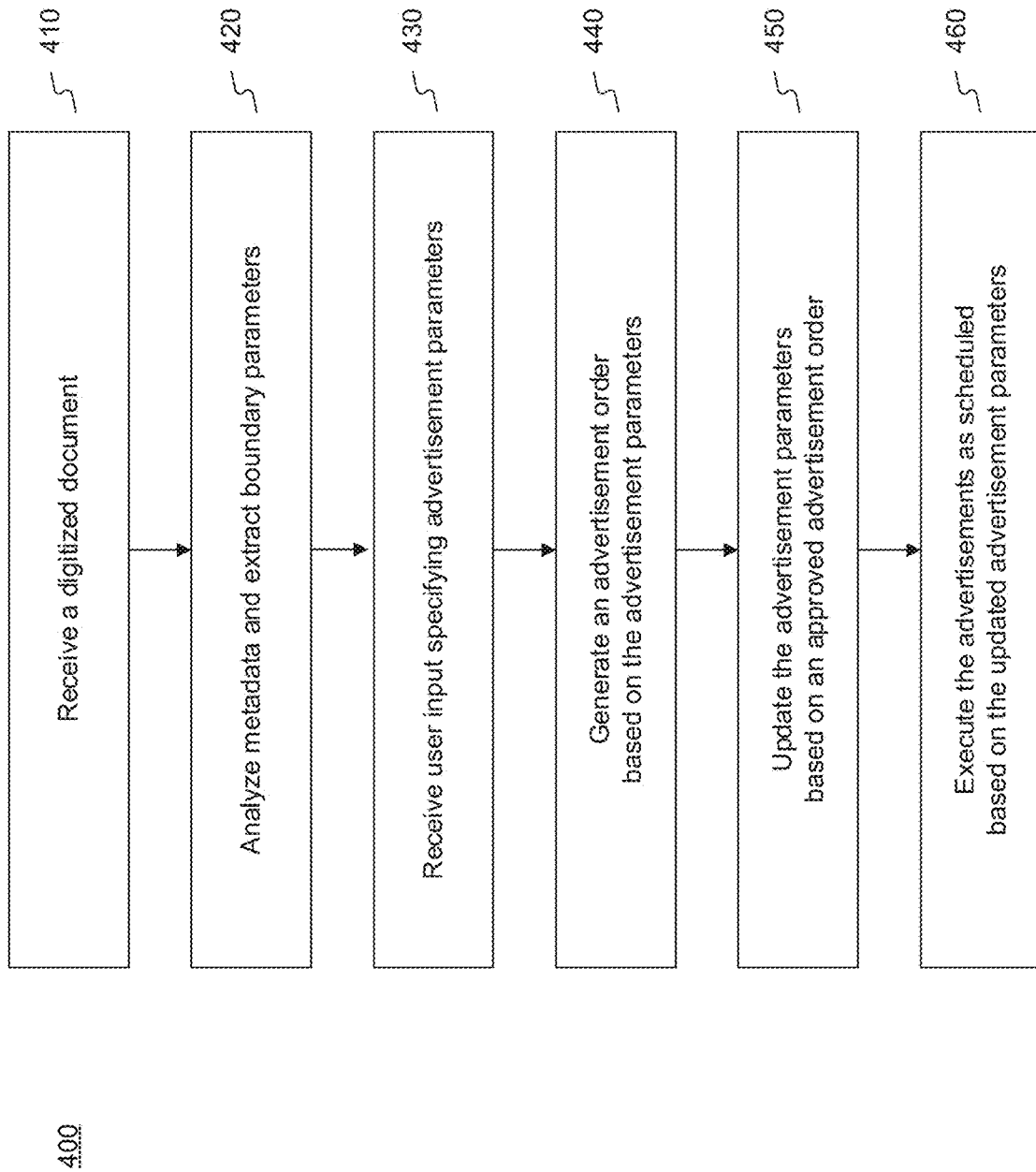
FIG. 4 is a flowchart of an exemplary computerized process for automatically creating electronic advertisement orders, consistent with the disclosed embodiments.

FIG. 4 is a flowchart of an exemplary computerized process 400 for automatically creating electronic advertisement orders. Process 400 may be performed by SCM 320 using its subsystems (i.e., agreement management system 321, ad tracker system 322, ad order management system 323, ad parameter database 324, and ad execution system 325) with the corresponding functions described above with respect to FIG. 3.

At step 410, agreement management system 321 may receive an electronic copy of an agreement. The copy may be a scanned version of the agreement such as a set of image files or an electronic document in a portable document format (PDF) or a word processing document.

At step 420, agreement management system 321 may analyze the agreement in a manner described above with respect to FIG. 3, where agreement management system 321 may analyze metadata of the electronic file containing the agreement to detect the type of the file and take appropriate actions for extracting the boundary parameters. In some embodiments, agreement management system 321 may assign a unique agreement identifier for the agreement, associate the boundary parameters with the agreement identifier, and transmit the boundary parameters to ad parameter database 324 for storage.

At step 430, ad tracker system 322 and ad order management system 323 may receive user input specifying advertisement parameters for customizing an advertisement plan. In some embodiments, ad tracker system 322 may transmit a request to ad parameter database 324 with a particular agreement identifier as a reference key. Ad parameter database 324 may, in response to the request, locate and return an advertisement record corresponding to the agreement identifier. Such data may contain general information on the corresponding agreement (e.g., name of the supplier, category, etc.), the boundary parameters, and different metrics on how much of the contracted budget has been utilized over time. The information may allow a user accessing ad tracker system 322 to assess current progress, allocate remaining contracted budget to different advertisement periods, and customize additional advertisement plans. In other embodiments, ad order management system 323 may automatically determine sets of advertisement parameters that maximize the advertisement costs within the contracted budgets and maximize the utilization rate of available spaces.

At step 440, ad order management system 323 may generate an advertisement order based on the customized advertisement plan as discussed above. Ad order management system 323 may then transmit the advertisement order to the corresponding supplier system for review.

At step 450, in response to a communication from the corresponding supplier system approving the advertisement order, ad order management system 323 may retrieve and update the advertisement parameters stored in ad parameter database 324 and associated with the current agreement identifier. If no communication from the corresponding supplier system is received for a predetermined period of time, ad order management system 323 may generate and send a reminder message to the corresponding supplier system or generate an alert to a user of ad order management system 323 to follow up with the corresponding supplier. Additionally or alternatively, if a communication from the corresponding supplier system is a rejection or an alternate proposal of the advertisement order, ad order management system 323 may generate an alert for the user to review the communication and take appropriate actions.

At step 460, ad execution system 325 may execute the advertisement plans as specified by the advertisement parameters stored in ad parameter database 324.

FIG. 5 is an exemplary embodiment of an ad tracker UI 500. Ad tracker UI 500 may be generated by ad tracker system 322 using data from ad parameter database 324. Ad tracker UI 500 may be configured to display current progress through different contracted budgets associated with one or more agreements. In some embodiments, all information associated with a particular agreement and its corresponding agreement identifier may be grouped into an advertisement record (e.g., record A 531).

In some embodiments, ad tracker UI 500 may comprise a search configurator 510, control buttons 520, and a tracker table 530.

In some embodiments, search configurator 510 may include one or more UI elements that allow a user to adjust search criteria to display a subset of available advertisement records in tracker table 530. For example, search configurator 510 may comprise graphical UI elements such as drop down lists, text input boxes, and radio buttons that allow the user to specify search criteria such as category, sub-category, agreement ID, effective periods, name or identifier of the manager assigned to each advertisement record, name or identifier of the supplier offering certain incentive programs, etc. The UI elements and different parameters depicted in FIG. 5 are only exemplary and other elements, layouts, and parameters are within the scope of the embodiments disclosed herein.

In some embodiments, control buttons 520 may comprise graphical UI buttons that allow a user to create a new advertisement record in response to a new agreement or export currently displayed advertisement records into a file. Additionally or alternatively, control buttons 520 may comprise buttons to reset search configurator 510 to default parameters or to hide search configurator 510 and display a larger tracker table 530.

In some embodiments, tracker table 530 may comprise rows corresponding to each advertisement record (e.g., record A 531) and columns corresponding to different aspects of the advertisement records. The advertisement records displayed in tracker table 530 may correspond to the search criteria specified by search configurator 510, and tracker table 530 may comprise multiple pages or sections to display a greater number of advertisement records than the five records depicted in FIG. 5.

In some embodiments, the columns of tracker table 530 may comprise those that display general information (e.g., columns for agreement ID, effective period, supplier, category, manager, or the like) and those that display current progress (e.g., columns for contracted budget, approved amount, remaining budget, or the like). In some embodiments, the columns that display current progress may comprise those that display the progress relative to the entire effective period (e.g., columns under annual total), and/or those that display progress relative to the current advertisement period (e.g., columns under current month). The columns described herein and depicted in FIG. 5 are only exemplary and other combinations of different information are within the scope of the disclosed embodiments.

In some embodiments, the columns for displaying the current progress relative to the entire effective period may include columns for displaying the contracted budget, approved amount, remaining budget, and overall progress. The overall progress may display a ratio between the approved amount and the contracted budget, showing overall utilization of the contracted budget. A higher ratio indicates a higher advertisement spending, which translates to an increased revenue that increases overall profit margin. In some embodiments, the overall progress may also include an average suggested progress based on the number of days remaining in the effective period. For example, an advertisement record with an effective period of one year may show an average suggested progress of 25% after three months.

In some cases, it is possible for the approved amounts to be greater than the contracted budget as shown in record A 531. Such overage may occur, for example, when the corresponding supplier authorized an additional advertisement budget after the initial agreement or when the initial agreement stipulated a limited amount of overage.

Additionally or alternatively, the columns for displaying the current progress relative to the current advertisement period may include columns for displaying the planned budget, ordered amount, and approved amount for the current advertisement period.

Still further, tracker table 530 may comprise columns for displaying warning labels (e.g., lagging performance label 532 or missing entry label 533) or editing buttons 534 for customizing advertisement plans. In some embodiments, the warning labels may serve to signal to a user that certain advertisement records need more attention based on a predetermined algorithm.

For example, ad tracker system 322 may cause to mark an advertisement record with lagging performance label 532 when the corresponding current progress falls short of the average suggested progress. Such label may serve to prompt the user to generate more advertisement plans before the effective period is over, thereby minimizing the lost opportunity of not maximizing revenue. In another example, ad tracker system 322 may cause to mark an advertisement record with missing entry label 533 when the advertisement record is missing advertisement plans for any of the advertisement periods within the effective period. Such label may also serve to prompt the user to generate more advertisement plans before the effective period is over.

The algorithms for marking advertisement records with markers described herein are only exemplary, and other algorithms for marking advertisement records are also within the scope of the disclosed embodiments. The particular labels or colors described herein are also only exemplary, and other means (e.g., pop-ups, flag icons, highlights) of drawing users' attention to particular incentive programs are also within the scope of the disclosed embodiments. In further embodiments, ad tracker system 322 may also transmit notifications or warning messages to mobile devices of the managers associated with the advertisement records.

Figure 6:
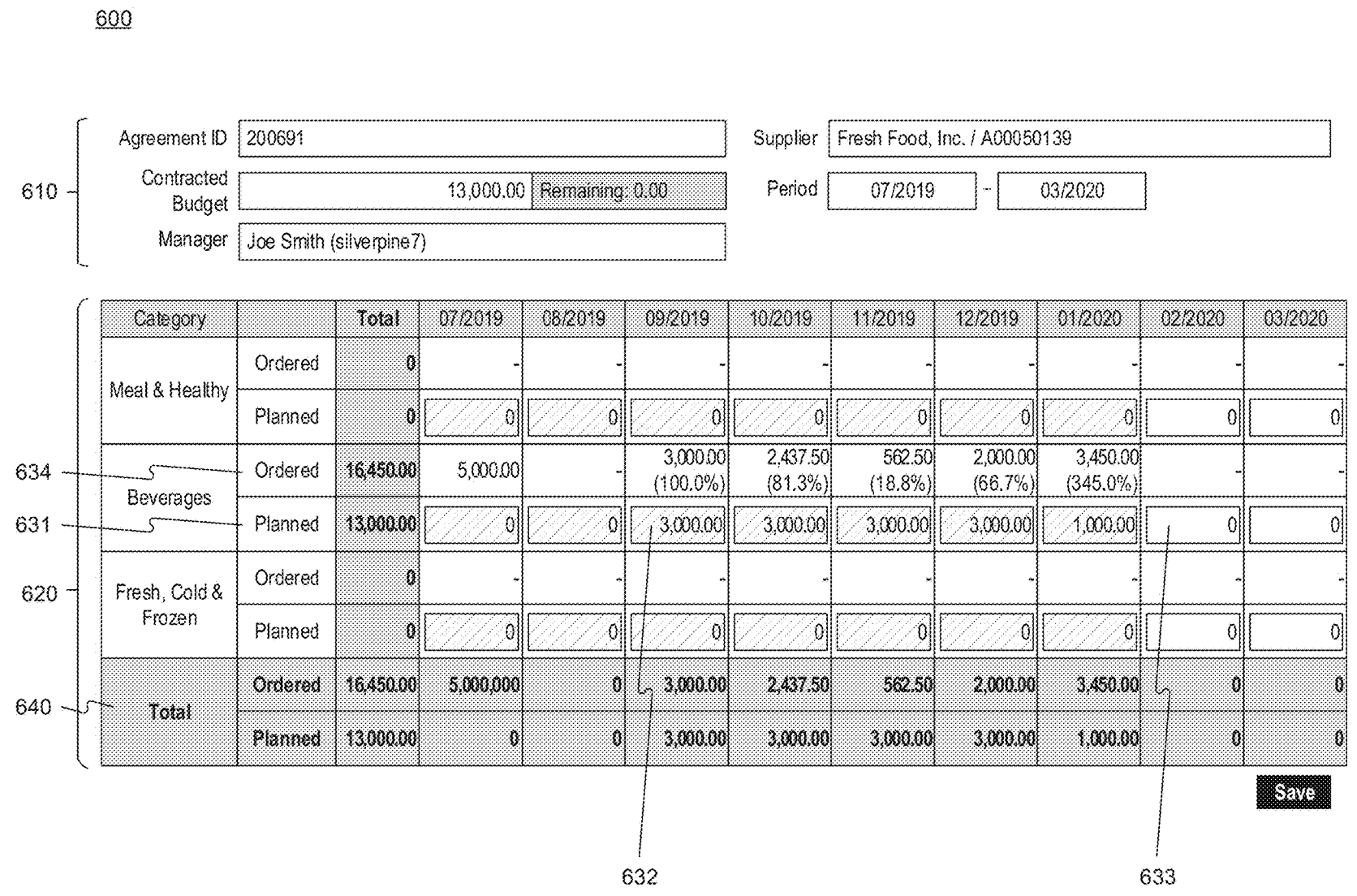

FIG. 6 is an exemplary embodiment of a record editing UI 600. In some embodiments, ad tracker system 323 may display record editing UI 600 in response to a user input selecting editing button 534 for a particular advertisement record. Additionally or alternatively, ad tracker system 323 may display record editing UI 600 in response to a user input for adding a new advertisement record (e.g., the "new record" button of control buttons 520). The record editing UI 600 depicted in FIG. 6 show the advertisement record of record A 531 in FIG. 5 for exemplary purposes.

In some embodiments, record editing UI 600 may comprise a record configurator 610 and a record table 620.

Record configurator 610 may comprise one or more UI elements that allow a user to view and edit general information associated with the current advertisement record. For example, record configurator may allow a user to view and edit the agreement identifier, contracted budget, manager of the advertisement record, supplier, and the effective period. Record configurator 610 may also comprise a UI element for displaying a remaining budget relative to the contracted budget based on the current progress.

In some embodiments, record table 620 may comprise rows for one or more categories of products that the supplier authorized advertising in (e.g., meal & healthy, beverages, or fresh, cold & frozen) and columns for each unit advertisement period within the effective period. The UI elements and different parameters depicted in FIG. 6 are only exemplary and other elements, layouts, and parameters are within the scope of the embodiments disclosed herein. For example, record table 620 may comprise other rows for displaying approved amounts or reserved amounts in addition to or instead of the ordered amounts or planned budgets.

In the example record depicted in FIG. 6, supplier Fresh Food, Inc. authorized advertisements in the three categories shown for a total contracted budget of $13,000 from July 2019 to March 2020. Furthermore, the associated manager in charge of the advertisement record or ad order management system 323 decided to spend the entire contracted budget in the beverage category. In some embodiments, the associated manager may allocate portions of the contracted budget for each advertisement period by entering desired values into input boxes in a planned budget sub-row 631 (e.g., enabled input box 633). The planned budgets allocated into each advertisement period may be adjusted as long as the advertisement period is not in the past. For example, disabled input boxes 632 show previously entered planned budgets for the corresponding advertisement period that are now disabled to prevent ex-post adjustments.

In some embodiments, ad tracker system 323 may update corresponding advertisement parameters in ad parameter database 324 according to the planned budgets entered via record table 620. Ad order management system 323 may then allow a user to generate customized advertisement plans for the associated categories and advertisement periods as described above with respect to FIGS. 3 and 4.

In further embodiments, record table 620 may also comprise an ordered amount sub-row 634 that show ordered amounts for each advertisement period. Ad tracker system 322 may display the values in ordered amount sub-row 634 based on the advertisement parameters updated based on the advertisement orders generated by ad order management system 323. In some embodiments, ordered amount sub-row 634 may also show ratios between the ordered amounts and the planned budgets to indicate how well the advertisement plans are being followed.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for automatic electronic order creation, the system comprising:
a plurality of sub-systems;
at least one non-transitory computer-readable medium configured to store instructions; and
at least one processor configured to execute the instructions to perform operations comprising:
storing, in at least one first database by a first sub-system of the plurality of systems, ad assets for displaying electronic advertisements for a plurality of products associated with a plurality of suppliers;
storing, in at least one second database, a plurality of available space associated with a plurality of time periods;
receiving, via a network by a second sub-system of the plurality of sub-systems, a plurality of digitized documents, each digitized document comprising embedded metadata related to contents of the digitized document;
analyzing, by the second sub-system, the embedded metadata;
in response to analyzing the embedded metadata, detecting, by the second sub-system, a file type of each digitized document;
for each digitized document of the plurality of digitized documents:
extracting, by the second sub-system, a boundary parameter from the digitized document based on the analyzed embedded metadata, wherein the boundary parameter is associated with a contracted budget for an electronic advertisement of one or more products,
monitoring, by a third sub-system of the plurality of sub-systems, a current progress of the boundary parameter, wherein the current progress of the boundary parameter is based on a fluctuating utilization of the contracted budget,
determining, by a fourth sub-system of the plurality of sub-systems based on at least one reference key associated with at least one supplier, at least one customized order based on the contracted budget, an effective period, a planned budget, at least one ad asset corresponding to at least one product, and at least one available space for the electronic advertisement within a webpage or user interface,
generating, by the fourth sub-system, a first cost for using the at least one available space for a time period and a second cost for generating the at least one ad asset within the at least one available space for the at least one customized order,
transmitting, by the fourth sub-system to the at least one supplier, a total cost associated with the at least one customized order based on the first cost and the second cost,
in response to receiving approval from the at least one supplier, transmitting, by the fourth sub-system, a signal to update the at least one second database to reserve the at least one available space for the time period, and
executing, by a fifth sub-system, the at least one customized order to display the at least one ad asset within the at least one available space.

2. The computer-implemented system of claim 1, wherein extracting the boundary parameter comprises:
extracting the embedded metadata from the digitized document;
detecting that the digitized document was created based on a predefined template; and
extracting the boundary parameter by extracting data from one or more predefined positions of the digitized document.

3. The computer-implemented system of claim 2, wherein instructions further comprise:
extracting a temporal parameter based on the embedded metadata.

4. The computer-implemented system of claim 3, wherein one or more predefined advertisement periods associated with the contracted budget is shorter than or equal to a period of time represented by the temporal parameter.

5. The computer-implemented system of claim 1, wherein the total cost is less than or equal to the boundary parameter.

6. The computer-implemented system of claim 1, wherein the digitized document is an agreement between two or more parties.

7. The computer-implemented system of claim 1, wherein one or more predefined advertisement periods associated with the contracted budget each span a month.

8. The computer-implemented system of claim 1, wherein determining the at least one customized order is based on configuration parameters that are based on a location, time, layout, or dimensions of the electronic advertisement.

9. A computer-implemented method for automatic electronic order creation, the method comprising:
storing, in at least one first database by a first system of a plurality of systems, ad assets for displaying electronic advertisements for a plurality of products associated with a plurality of suppliers;
storing, in at least one second database, a plurality of available space associated with a plurality of time periods;

receiving, via a network by a second system of the plurality of systems, a plurality of digitized documents, each digitized document comprising embedded metadata related to contents of the digitized document;

analyzing, by the second system, the embedded metadata;

in response to analyzing the embedded metadata, detecting, by the second system, a file type of each digitized document;

for each digitized document of the plurality of digitized documents:

extracting, by the second system, a boundary parameter from the digitized document based on the analyzed embedded metadata, wherein the boundary parameter is associated with a contracted budget for an electronic advertisement of one or more products, monitoring, by a third system of the plurality of systems, a current progress of the boundary parameter, wherein the current progress of the boundary parameter is based on a fluctuating utilization of the contracted budget, determining, by a fourth system of the plurality of systems based on at least one reference key associated with at least one supplier, at least one customized order based on the contracted budget, an effective period, a planned budget, at least one ad asset corresponding to at least one product, and at least one available space for the electronic advertisement within a webpage or user interface, generating, by the fourth system, a first cost for using the at least one available space for a time period and a second cost for generating the at least one ad asset within the at least one available space for the at least one customized order, transmitting, by the fourth system to the at least one supplier, a total cost associated with the at least one customized order based on the first cost and the second cost, in response to receiving approval from the at least one supplier, transmitting, by the fourth system, a signal to update the at least one second database to reserve the at least one available space for the time period, and executing, by a fifth system, the at least one customized order to display the at least one ad asset within the at least one available space.

10. The computer-implemented method of claim 9, wherein extracting the boundary parameter comprises:

extracting the embedded metadata from the digitized document;

detecting that the digitized document was created based on a predefined template; and extracting the boundary parameter by extracting data from one or more predefined positions of the digitized document.

11. The computer-implemented method of claim 10, further comprising:

extracting a temporal parameter based on the embedded metadata.

12. The computer-implemented method of claim 11, wherein one or more predefined advertisement periods associated with the contracted budget is shorter than or equal to a period of time represented by the temporal parameter.

13. The computer-implemented method of claim 9, wherein the total cost is less than or equal to the boundary parameter.

14. The computer-implemented method of claim 9, wherein the digitized document is an agreement between two or more parties.

15. The computer-implemented method of claim 9, wherein one or more predefined advertisement periods associated with the contracted budget each span a month.

16. The computer-implemented method of claim 9, wherein determining the at least one customized order is based on configuration parameters that are based on a location, time, layout, or dimensions of the electronic advertisement.

* * * * *